US008625773B2

(12) United States Patent  (10) Patent No.: US 8,625,773 B2
Mills et al.  (45) Date of Patent: Jan. 7, 2014

(54) SYSTEM AND METHOD FOR ANALYZING AUTOMATIC SPEECH RECOGNITION PERFORMANCE DATA

(75) Inventors: Scott H. Mills, Arlington, VA (US); John M. Martin, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 739 days.

(21) Appl. No.: 12/106,753

(22) Filed: Apr. 21, 2008

(65) Prior Publication Data

US 2008/0228489 A1    Sep. 18, 2008

Related U.S. Application Data

(63) Continuation of application No. 10/683,648, filed on Oct. 10, 2003, now Pat. No. 7,383,170.

(51) Int. Cl.
H04M 3/00 (2006.01)
G10L 11/00 (2006.01)

(52) U.S. Cl.
USPC ..................... 379/265.06; 704/270

(58) Field of Classification Search
USPC .................. 379/265.01–265.14; 704/270
See application file for complete search history.

(56) References Cited

U.S. PATENT DOCUMENTS

| 6,233,570 | B1 | 5/2001 | Horvitz et al. |
| 6,247,149 | B1 * | 6/2001 | Falls et al. ................. 714/45 |
| 6,405,170 | B1 * | 6/2002 | Phillips et al. ................. 704/270 |
| 6,904,143 | B1 * | 6/2005 | Peterson et al. ................. 379/265.01 |
| 7,263,489 | B2 * | 8/2007 | Cohen et al. ................. 704/270 |
| 2003/0078782 | A1 | 4/2003 | Blair |
| 2003/0105630 | A1 | 6/2003 | MacGinitie et al. |

* cited by examiner

Primary Examiner — Samuel G Neway
(74) Attorney, Agent, or Firm — Jackson Walker L.L.P.

(57) ABSTRACT

In a disclosed method for interpreting automatic speech recognition (ASR) performance data, a data processing system may receive user input that selects a log file to be processed. The log file may contain log records produced by an ASR system as a result of verbal interaction between an individual and the ASR system. In response to receiving the user input, the data processing system may automatically interpret data in the log records and generate interpretation results. The interpretation results may include a duration for a system prompt communicated to the individual by the ASR system, a user response to the system prompt, and a duration for the user response. The user response may include a textual representation of a verbal response from the individual, obtained through ASR. The interpretation results may also include an overall duration for the telephone call.

15 Claims, 5 Drawing Sheets

| System | Participant |
|---|---|
| *Thank you for calling SBC directory assistance. Do you want a phone number, a name and address, or something else?* | *A phone number* |
| *What city and state?* | *Edmond, Oklahoma* |
| *What name?* | *(unintelligible)* |
| *(System transfers call to live operator.)* | |
| | |

```
04-15/07:29:44.115 T01.0000.0024 call_start
5123386065:5123465300:20020415873784024:N/A
04-15/07:29:44.254 T01.0000.0024 log   :SubjectID=Ginny, 2002-4-15/7:29:44,
ANI=5123465300,CGU,FRL
04-15/07:29:44.254 T01.0000.0024 prompt audio/70.vox;
04-15/07:29:50.954 T01.0000.0024 prompt_end done:
04-15/07:29:51.014 T01.0000.0024 prompt audio/11.vox;
04-15/07:29:56.654 T01.0000.0024 prompt_end done:
04-15/07:30:00.535 T01.0000.0024
ASR_DONE:results;grammar:+<_gram1>answer:phone:95|95|<phone number>-Bargein-
_bargein_;|cgu
04-15/07:30:00.554 T01.0000.0024 input_end  :phone
04-15/07:30:00.554 T01.0000.0024 filled_enter ALL:cgu
04-15/07:30:00.594 T01.0000.0024 prompt audio/41.vox;
04-15/07:30.03.394 T01.0000.0024 prompt_end done:
04-15/07:30:07.356 T01.0000.0024
ASR_DONE:results;grammar:+<_gram1>city:Edmond:82+<_gram1>state:OK:94|82|<Edmond
Oklahoma>-Bargein-_bargein_;|cs_slots
04-15/07:30:07.374 T01.0000.0024 input_end :
04-15/07:30:07.394 T01.0000.0024 call_appl DA-subDA:
04-15/07:30:07.434 T01.0000.0024 call_appl DA-chkFRL:
04-15/07:30:07.584 T01.0000.0024 prompt audio/3.vox;
04-15/07:30:10.184 T01.0000.0024 prompt_end done:
04-15/07:30:14.398 T01.0000.0024  ASR_REJECTED:results;grammar:REC THREAD 0, all the
recognition results scores are lower than confidence score-Bargein-
_bargein_;|frl_slots
04-15/07:30:14.414 T01.0000.0024 event NOMATCH:1
04-15/07:30:14.434 T01.0000.0024 call_appl DA-xferOperator:
04-15/07:30:14.434 T01.0000.0024 prompt audio/2.vox;
04-15/07:30:17.894 T01.0000.0024 prompt_end done:
04-15/07:30:17.994 T01.0000.0024 call_appl DA-toOpData.jsp:
04-15/07:30:17.994 T01.0000.0024 log :End Automation >>>2002-4-15/7:30:17,
ANI=5123465300
04-15/07:30:20.496 T01.0000.0024 log :Start Store and Forward >>>2002-4-15/7:30:20,
ANI=5123465300
04-15/07:30:27.521 T01.0000.0024 log :End Store and Forward >>>2002-4-15/7:30:27,
ANI=5123465300
04-15/07:31:02.754 T01.0000.0024 call_end usrend
```

*FIG. 3*

|   | Indicator String | Event | Procedure |
|---|---|---|---|
| 1 | call_start | Call start | Record call start time from timestamp |
| 2 | log: SubjectID = | Participant ID | Record the ID |
| 3 | prompt audio/70.vox | Dialog start | Record that a new dialog started and when it started |
| 4 | prompt audio/11.vox | Dialog start | Record that a new dialog started and when it started |
| 5 | prompt_end done | Prompt end | Record time that "listening" started |
| 6 | ASR-DONE:results | ASR result | A. Record result of ASR attempt (utterance recognized as the words "phone number"). B. Calculate elapsed time for current dialog. C. Store all data relevant to this dialog. |
| 7 | prompt audio/41.vox | Dialog start | Record that a new dialog started and when it started |
| 8 | call_end usrend | Call end | A. Calculate call duration B. Print one line for each dialog in call |
|   | . . . | . . . | . . . |

*FIG. 6*

| SUBID | CALLNUM | PATH | DATE | CALLSTART | CALLDUR | VALID? | ASRDUR | GETOPDUR | SAFDUR | LIVEDUR |
|---|---|---|---|---|---|---|---|---|---|---|
| 99 | 1 | CGU,FRL | 15-Apr | 07:29:44.115 | 78.639 | valid | 33.879 | 2.502 | 7.25 | 35.233 |

| DLGNAME | DLGDUR | PROMPTNAME | PRMTDUR | PRMTENDTYPE | RECRSLT |
|---|---|---|---|---|---|
| Greeting | 6.76 | Greeting | 6.7 | done: | |
| Main_Menu? | 9.58 | Main_Menu? | 5.64 | done: | phone number |
| City_State? | 6.99 | City_State? | 2.8 | done: | Edmond Oklahoma |
| Name,_please? | 6.85 | Name,_please? | 2.6 | done: | REJECTED |
| OBWYM(Default) | 3.56 | OBWYM(Default) | 3.46 | done: | |

SYSTEM AND METHOD FOR ANALYZING AUTOMATIC SPEECH RECOGNITION PERFORMANCE DATA

TECHNICAL FIELD OF THE INVENTION

The present invention relates in general to information handling systems and, in particular, to a system, a method, and a program product for analyzing automatic speech recognition performance data.

BACKGROUND OF THE INVENTION

Automatic speech recognition (ASR) technology has improved greatly in recent years, and various companies are beginning to use it to provide customer service, such as in interactive voice response (IVR) systems. Multiple vendors offer different forms of ASR technology, and customers may desire to analyze and compare competing ASR products before selecting a particular ASR product for implementation.

For example, a company may desire to evaluate and compare selected ASR products or systems by conducting usability studies in which individuals, such as customers of the company, interact with the selected ASR systems by telephone. Each ASR system may interpret the participant's utterances and produce a log file detailing each event that occurs during a call. The ASR log files would thus contain ASR performance data. As recognized by the present invention, logs files produced by ASR products are difficult to analyze because of their content and form. The present invention addresses that difficulty.

BRIEF DESCRIPTION OF THE DRAWINGS

A more complete understanding of the present invention and advantages thereof may be acquired by referring to the appended claims, the following description of one or more example embodiments, and the accompanying drawings, in which:

FIG. 3 depicts a table that portrays an example log file to be processed by the ASR performance data analysis engine of FIG. 1;

FIG. 5 depicts a flowchart of an example embodiment of a process for analyzing ASR performance data, according to the present disclosure;

FIG. 6 depicts a table of example events, indicator strings, and automated processes according to the present disclosure; and FIG. 7 depicts an example embodiment of interpretation results generated by the ASR performance data analysis engine of FIG. 1.

DETAILED DESCRIPTION OF EXAMPLE EMBODIMENT(S)

The logs files produced by ASR products are difficult to analyze. Consequently, even though usability studies may be performed in which customers interact with different ASR systems by telephone, it is difficult to evaluate the performance of an ASR system and to compare the performance of different ASR systems.

This document describes example embodiments of a system, a method, and a program product for analyzing ASR performance data. Advantages of various embodiments of the present invention may include making it easier to evaluate the performance of an individual ASR system and easier to compare the performance of different systems.

Figure 1:
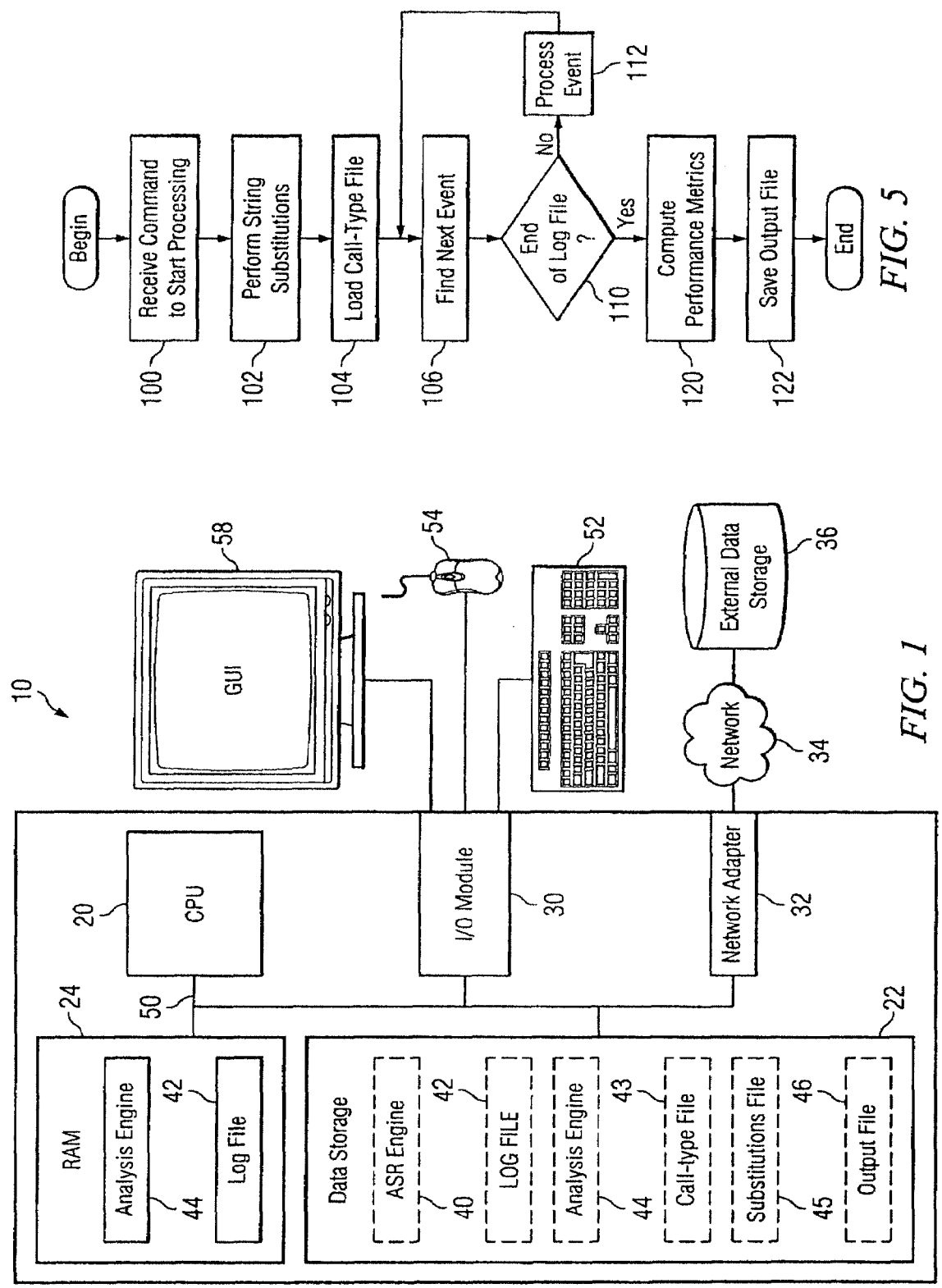
FIG. 1 depicts a block diagram of an example embodiment of a system for analyzing automatic speech recognition (ASR) performance data, according to the present disclosure.

FIG. 1 depicts a block diagram of an example embodiment of a system for analyzing ASR performance data, according to the present disclosure. As illustrated, a data processing system 10 may include one or more central processing units (CPUs) 20 that communicate with input/output (I/O) components, data storage components, and other components via one or more system buses 50. The I/O components in data processing system 10 may include one or more communications adapters, such as network adapter 32, for communicating with remote systems or components, such as external data storage 36, via a network 34. The I/O components may further include one or more I/O modules 30 in communication with I/O devices such as a display 58, a keyboard 52, and a mouse 54. The data storage components may include various volatile and non-volatile data storage devices. For instance, data processing system 10 may include one or more volatile data storage devices, such as random access memory (RAM) 24, and non-volatile internal data storage 22, such as one or more hard disk drives. Thus, data processing system 10 may use internal data storage 22, external data storage 36, or a combination of internal and external data storage devices.

According to the illustrated embodiment, data processing system 10 may be used to host an ASR product, and also to analyze the performance of that ASR product. However, in alternative embodiments, separate data processing systems may be used for those two functions.

During a study or trial, a human participant may interact with the ASR product or system by telephone. Each call can be characterized as a series of one or more dialogs or exchanges between the ASR system and the participant. The participant's utterances may include responses to verbal prompts, such as questions or instructions, generated by the ASR system. In general, a system generated prompt and the corresponding response, if any, may be referred to collectively as an "individual exchange." Verbal interactions between the ASR system and a participant may be referred to in general as "dialog."

Figures 2, 4:
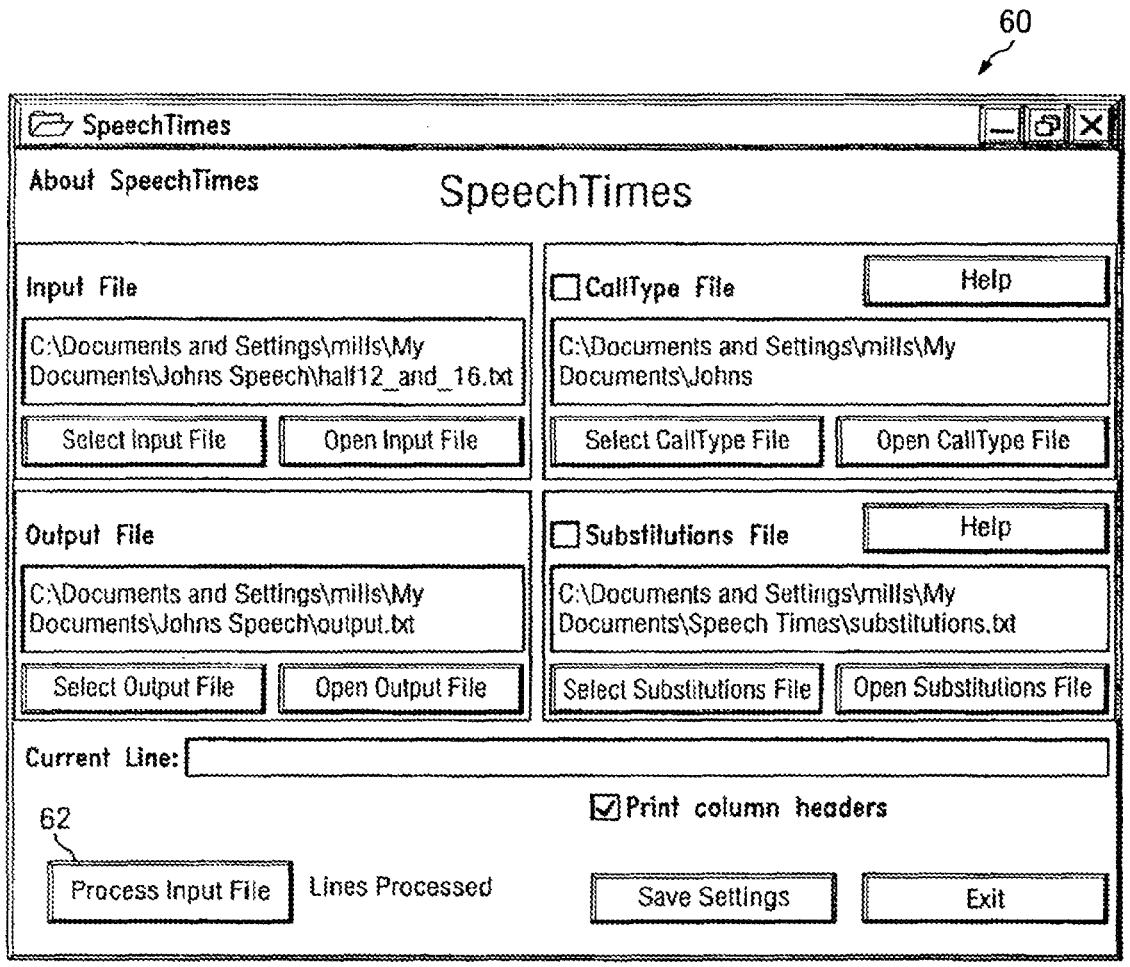
FIG. 2 depicts a table that portrays example dialog involving an example ASR system.
FIG. 4 depicts an example embodiment of a user interface produced by the ASR performance data analysis engine of FIG. 1.

FIG. 2 depicts a table that portrays example dialog involving an example ASR system. For instance, in a dialog, the ASR system may play a recording to prompt the participant. The participant may then respond with an utterance. The ASR system may then attempt to interpret the response using ASR. Based on the interpretation, or the failure to interpret, the ASR system may repeat the prompt, play a new prompt, end the call, or take some other action. Referring again to FIG. 1, the ASR system may include an ASR engine 40 that interprets the participant's utterances and produces a log file 42 detailing each event that occurs during the trial.

FIG. 3 depicts a table that portrays an example log file 42 from ASR engine 40. As illustrated, log file 42 may include many different kinds of information. Much of the information may not be necessary for the purposes of a particular study. Log file 42 may also be formatted in a way that makes it difficult for a person to locate the information necessary for a particular study. The formatting may also make it difficult to decipher or understand that information. In addition, the log file may not directly contain all of the data of interest to a reviewer. For instance, it may be necessary to compute certain types of data, such as the duration of certain events, based on information in log file 42 such as start times and end times.

Furthermore, multiple trials may be run to generate performance data from multiple ASR systems, and multiple participants may interact with each of those ASR systems. Consequently, the reviewer may be faced with the task of analyzing and comparing a large number of log files 42.

As illustrated in FIG. 1, data processing system 10 includes an analysis engine 44 for automatically processing ASR performance data, such as the data in log file 42. Analysis engine 44 may also be referred to as an ASR log analysis engine 44.

Data processing system 10 may also include a call-type file 43 and a substitutions file 45. As described in greater detail below, analysis engine 44 may use call-type file 43 and substitutions file 45 to process log file 42. For instance, call-type file 43 may contain event definitions that help analysis engine 44 interpret log file data, and substitutions file 45 may contain predefined replacement definitions to be applied to log files.

In the illustrated embodiment, programs or applications such as analysis engine 44 may be copied from internal data storage 22 into RAM 24 for execution. Likewise, data to be processed, such as call-type file 43, substitutions file 45, log file 42, or parts thereof, may be copied to RAM 24 for processing. Programs or data may also be retrieved by data processing system 10 from external data storage 36.

In operation, analysis engine 44 may generate one or more user interface screens to allow the user to set various parameters and execute various functions. For instance, FIG. 4 depicts an example embodiment of a user interface screen 60 produced by analysis engine 44. Screen 60 may also be referred to as a control panel 60.

As illustrated, control panel 60 allows the user to select and open input files and output files. In addition, control panel 60 allows the user to select and open call-type files and substitutions files. By selecting a file, the user may specify the file to be processed or generated by analysis engine 44. Opening a file may cause the file to be opened in a new window, possibly in a new application, such as a spreadsheet or word processing application.

Multiple substitutions files may be predefined, with each including data that analysis engine 44 may use to replace specified strings with specified replacement strings, during the process of analyzing or interpreting a selected log file. The different substitutions files may be used for processing log files from different ASR systems. Similarly, multiple call-type files may be predefined, with each including data that analysis engine 44 may use to interpret a selected log file. The different call-type files may be used to interpret log files from different ASR systems. Different call type files may associate different event indicator strings with the same event or event identifier.

Control panel 60 may also allow the user to save the current settings, to specify whether column headers should be sent to the output file, and to initiate processing of the specified log file. A progress indicator may also be provided.

FIG. 5 depicts a flowchart of an example embodiment of a process for analyzing ASR performance data, according to the present disclosure. The illustrated process is described with reference to operations performed by data processing system 10. The process starts with a user having utilized control panel 60 to select log file 42 as the input file, output file 46 as the output file, call-type file 43 as the call-type file, and substitutions file 45 as the substitutions file.

At block 100, analysis engine 44 receives a command to start processing, for instance in response to a user clicking on process button 62 in FIG. 4. In response, analysis engine 44 may copy log file 42 into RAM 24, and analysis engine 44 may automatically scan through that copy of log file 42, performing string substitutions, in accordance with the predefined replacement definitions in substitutions file 45, as shown at block 102. For example, analysis engine 44 may change "prompt audio/70.vox" to "Greeting," and analysis engine 44 may change "prompt audio/11.vox" to "Opening prompt."

Analysis engine 44 may then begin an iterative process of automatically extracting and translating data from the modified log file 42 in RAM 24, based on call-type file 43. For instance, as depicted at block 104, analysis engine 44 may load call-type file 43 into RAM 24. As shown at block 106, analysis engine 44 may begin stepping through each line in log file 42 to find a relevant event.

For example, call-type file 43 may contain a number of event definitions. An event definition may include a string that is known to correspond to a certain type of event in log files such as log file 42. Such strings may be called event indicator strings. Analysis engine 44 may search for those strings when processing each line in log file 42. An event definition may also include a standard identifier for a particular type of event or data, linking that type of event or data to a specific event indicator string. Analysis engine 44 may disregard any event in log file 42 that is not specified in call-type file 43.

As shown at block 110, analysis engine 44 may determine whether the end of log file 42 was reached. If the end of the log file was not reached, analysis engine 44 may process the event that was found, as shown at block 112. For example, as events are found, analysis engine 44 may store various values pertaining to the performance of the ASR system that produced log file 42, and may compute various relevant performance metrics. Consequently, as described in greater detail below, analysis engine 44 may find and interpret specific, predefined call events or characteristics in log file 42, based on the event definitions. Analysis engine 44 may also extract relevant values from log file 42, based on the event indicator strings defined in call-type file 43. For example, analysis engine 44 may extract the start time and date for the call, as well as a participant or customer identifier ("ID").

FIG. 6 depicts a table of some example events, indicator strings, and automated processes according to the present disclosure. When processing the first line of log file 42, for example, analysis engine 44 may recognize the event indicator string "call_start," and, in response, record the call start time from the timestamp in that line as a characteristic for a standardized "call start" event. Those operations are represented by row 1 in FIG. 6.

As indicated in row 2, analysis engine 44 may then recognize the event indicator string "log: SubjectID=" in the third line of log file 42, and, in response, record "Ginny" as the pertinent characteristic. As depicted in row 3, analysis engine 44 may then recognize the event indicator string "prompt audio/70.vox" in the fifth line of log file 42, and, in response, extract the start time for that prompt from the timestamp in that line. Alternatively, the fifth line of log file 42 may include the event indicator string "Greeting" instead of "prompt audio/70.vox," pursuant to the substitution process described above, and analysis engine 44 may recognize and process "Greeting" as the event indicator string.

Although FIG. 6 illustrates examples of various types of events that may be recognized and processed by analysis engine 44, many additional events, such as "prompt end" events, "input end" events, and other events or values, may also be recognized and processed by analysis engine 44, in accordance with the approach described herein. For instance, analysis engine 44 may recognize the event indicator string "prompt_end done:" in line six of log file 42, and, in response, may extract the end time from the timestamp in that line. Analysis engine 44 may then compute and record the prompt duration for the greeting, based on the pertinent start time and end time.

Further examples of the performance metrics or characteristics that may be extracted or computed by analysis engine 44 may include, without limitation, the following:
- the duration of each individual exchange;
- the duration of each prompt;
- the duration of the caller's utterance;
- the latency or time interval between the end of the prompt and the beginning of the caller's utterance;
- the results of the attempts by the ASR system to recognize the caller's utterance;
- the duration of the entire call.

Additional event definitions may be predefined, with event indicator strings for events relevant to any particular project.

The data values and performance metrics that are recognized or generated during the process of finding and processing events may be referred to in general as interpretation results. According to the example embodiment, some or all of the interpretation results may ultimately be saved in output file 46, in internal data storage 22 or in external data storage 36, displayed on display device 58, and/or printed.

FIG. 7 depicts example interpretation results that may be generated by analysis engine 44 and saved in output file 46. The interpretation results may be categorized as general characteristics and exchange characteristics. The general characteristics and the exchange characteristics may also be referred to as general analysis results and exchange analysis results, respectively. The general characteristics may include values that pertain to an entire call, such as the ID of the participant, the duration of the call, etc. In FIG. 7, general characteristics and labels for those values are presented in the first two rows. According to the example embodiment, exchange characteristics may include values pertaining to individual exchanges within a call. The labels and values starting at row four in FIG. 7 may represent exchange characteristics.

For example, the duration of individual exchanges are depicted under the heading "DLGDUR." The duration of prompts are depicted under the heading "PRMTDUR." The results of attempts by the ASR system to recognize speech are depicted under the heading "RECRSLT." Identifiers or names for the different messages played by the ASR system are listed under the heading "PROMPTNAME." In addition, a dialog may include a group of prompts. Thus, there may be several prompt names within a given dialog name listed under the heading "DLGNAME". Analysis engine 44 may extract the prompt names, the dialog names, and other data from log file 42 after some or all of those names have been provided pursuant to the substitution process described above. Data that indicates whether the prompt played to completion or whether, instead, the prompt ended early may be depicted under the heading "PRMTENDTYPE." For instance, if a caller barges in with a response while a prompt is still playing, the ASR system may terminate the prompt as soon as it detects the speech.

Referring again to FIG. 5, after analysis engine 44 processes an event, analysis engine 44 may search log file 42 for the next event, as indicated by the arrow returning to block 106 from block 112. As indicated at block 120, after all of the lines in log file 42 have been analyzed, analysis engine 44 may compute the general analysis results, such as the duration of the entire call listed under the heading "CALLDUR," and the total amount of time spent playing prompts. Other general analysis results may include, without limitation, the following:

- an identifier for the participant or subject under "SUBID,"
- an identifier for a particular call to distinguish multiple calls from the same subject under "CALLNUM,"
- identifiers for different call designs being tested under "PATH,"
- the date and time the call started,
- the duration of time spent in dialog between the caller and the ASR system under "ASRDUR,"
- the elapsed time between termination of the ASR dialog and pick up by the operator under "GETOPDUR,"
- the time duration for "storing and forwarding" the information received from the subject to the operator under "SAFDUR," and
- the time duration spent with the subject connected to the live operator under "LIVEDUR."

As illustrated at block 122, analysis engine 44 may then save the interpretation results to output file 46. The automated interpretation process may then end. A user may then open output file 46, for instance by selecting the "Open Output File" button on control panel 60.

By using the approach described above, analysis engine 44 may generate output file 46 with format and content that may be understood by a person with relative ease, compared to log file 42. Output file 46 may omit unnecessary information, and may include results that were computed by analysis engine 44, possibly without including the data values used in such computations. In one embodiment, the interpretation results may reproduce less than half of the data from the log file. In alternative embodiments, the interpretation results may reproduce less than seventy-five percent of the data from the log file.

Although the present invention has been described with reference to various example embodiments, those with ordinary skill in the art will understand that numerous variations of those embodiments could be practiced without departing from the scope and spirit of the present invention. For example, one of ordinary skill will appreciate that alternative embodiments could be deployed with many variations in the number and type of components in the system, the network protocols, the system or network topology, the distribution of various software and data components among the data processing systems in the network, and myriad other details (e.g., the length of various fields or columns, the number of columns, and other characteristics of the output.) without departing from the present invention.

It should also be noted that the hardware and software components depicted in the example embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein. In alternative embodiments, information handling systems incorporating the invention may include personal computers, mini computers, mainframe computers, distributed computing systems, and other suitable devices.

In alternative embodiments, the trial of the ASR system may be performed by one data processing system, and the performance analysis may be performed by a different data processing system, with reference to the results from the trial. Similarly, one or more of the components illustrated as residing in internal data storage may instead reside in external data storage.

Alternative embodiments of the invention also include computer-usable media encoding logic such as computer instructions for performing the operations of the invention. Such computer-usable media may include, without limitation, storage media such as floppy disks, hard disks, CD-ROMs, read-only memory, and random access memory; as well as communications media such as wires, optical fibers, microwaves, radio waves, and other electromagnetic or optical carriers. The control logic may also be referred to as a program product.

Many other aspects of the example embodiment may also be changed in alternative embodiments without departing from the scope and spirit of the invention. The scope of the invention is therefore not limited to the particulars of the embodiments or implementations illustrated herein, but is defined by the appended claims.

What is claimed is:

1. A method for interpreting automatic speech recognition performance data, the method comprising:
   in response to receiving first user input indicative of a log file, selecting, by a data processing system, the log file for processing, wherein the log file contains log records produced by an automatic speech recognition system as a result of verbal interaction between an individual and the automatic speech recognition system during a telephone call;
   receiving second user input indicative of a call-type file containing a list of event definition strings, wherein each event definition string listed includes a character string indicating a corresponding event type;
   interpreting log records associated with event types listed in the call-type file and disregarding log records not associated with event types listed in the call-type file, wherein the name of the individual is an event type defined in the call-type file;
   generating interpretation results including general analysis results and exchange analysis results; and
   generating an output file including the interpretations results;
   wherein the general analysis results in the output file include:
      an identifier for the individual, a date for the telephone call, a start time for the telephone call, an end time for the telephone call, an overall duration for the telephone call, a total amount of time spent playing prompts, an identifier for a particular call to distinguish multiple calls from the same individual, an identifier to indicate one of multiple call designs being tested, a duration of time spent in dialog between the caller and the ASR system, the elapsed time between termination of the automatic speech recognition dialog and pick up by an operator, the time duration for storing and forwarding information received from the individual to the operator, and the time duration spent with the subject connected to the operator; and
   wherein the exchange analysis results in the output file include:
      an identifier for a system prompt communicated to the individual by the automatic speech recognition system and a user response to the system prompt, wherein the user response includes a textual representation of a verbal response from the individual, and a duration for the user response; and
      wherein the exchange analysis results group the identifier for the system prompt, the user response, and the duration for the user response.

2. A method for interpreting automatic speech recognition performance data, the method comprising:
   in response to receiving, by a data processing system, first user input, selecting, by the data processing system, a log file containing log records indicative of an interaction between an individual and an automatic speech recognition system, wherein the name of the individual is indicated by the first user input;
   in response to receiving a second user input, selecting a substitutions file including a set of original character strings and a corresponding set of replacement character strings, wherein the replacement character strings are human-readable text strings;
   replacing a log record character string that matches one of the set of original character strings with a corresponding one of the set of replacement character strings; and
   after replacing the log record character string, interpreting the log records and generating interpretation results including general analysis results and exchange analysis results;
   generating an output file including the interpretations results;
   wherein the general analysis results in the output file include:
      an identifier for the individual, a date for the telephone call, a start time for the telephone call, an end time for the telephone call, an overall duration for the telephone call, a total amount of time spent playing prompts, an identifier for a particular call to distinguish multiple calls from the same individual, an identifier to indicate one of multiple call designs being tested, a duration of time spent in dialog between the caller and the ASR system, the elapsed time between termination of the automatic speech recognition dialog and pick up by the operator, the time duration for storing and forwarding information received from the individual to the operator, and the time duration spent with the subject connected to the operator;
   wherein the interpretation results in the output file include a duration for a time interval between the end of a system prompt communicated to the individual by the automatic speech recognition system and a response from the individual to the system prompt.

3. A method according to claim 2, wherein the interaction occurred during a telephone call.

4. A method according to claim 2, wherein interpreting the log records and generating the interpretation results includes:
   identifying a start time for the system prompt within the log file;
   identifying an end time for the system prompt within the log file; and
   computing the duration for the system prompt based on the start time and the end time.

5. A method according to claim 2, wherein interpreting the log records and generating the interpretation results includes:
   identifying a start time for the response from the individual within the log file;
   identifying an end time for the response from the individual within the log file; and
   computing the duration for the response from the individual based on the start time and the end time.

6. A method according to claim 2, wherein generating the interpretation results includes:
   generating interpretation results that reproduce less than seventy-five percent of data from the log file.

7. A method according to claim 2, wherein generating the interpretation results includes:

generating interpretation results that reproduce less than half of data from the log file.

8. A non-transitory computer readable medium including stored, processor executable instructions that, when executed by a processor, cause the processor to perform operations comprising:

selecting a log file to be processed in response to receiving a first user input during a telephone call, wherein selection of the log file is based on a name of an individual and further wherein the log file contains log records indicative of an interaction between the individual and an automatic speech recognition system;

selecting, in response to receiving a second user input, a substitutions file for use by the processor in the processing of the log file;

substituting replacement character strings for log record character strings that match original character strings, wherein the replacement character strings and the corresponding original character strings are listed in the substitutions file, and wherein the replacement character strings are human-readable text strings; and interpreting data in the log records and generating interpretation results including general analysis results and exchange analysis results;

generating an output file including the interpretations results;

wherein the general analysis results in the output file include:

an identifier for the individual, a date for the telephone call, a start time for the telephone call, an end time for the telephone call, an overall duration for the telephone call, a total amount of time spent playing prompts, an identifier for a particular call to distinguish multiple calls from the same individual, an identifier to indicate one of multiple call designs being tested, a duration of time spent in dialog between the caller and the ASR system, the elapsed time between termination of the automatic speech recognition dialog and pick up by an operator, the time duration for storing and forwarding information received from the individual to the operator, and the time duration spent with the subject connected to the operator;

wherein the generated interpretation results include a duration for a time interval between the end of a system prompt communicated to the individual by the automatic speech recognition system and a user response to the system prompt.

9. The non-transitory computer readable medium of claim 8, wherein interpreting data in the log records and generating the interpretation results comprises:

identifying a start time for the system prompt within the log file;
identifying an end time for the system prompt within the log file; and
computing the duration for the system prompt, based on the start time and the end time.

10. The non-transitory computer readable medium of claim 8, wherein interpreting the data in the log records and generating the interpretation results comprises:

identifying a start time for the user response within the log file;
identifying an end time for the user response within the log file; and
computing the duration for the user response, based on the start time and the end time.

11. The non-transitory computer readable medium of claim 8, wherein generating the interpretation results includes:

generating interpretation results that reproduce less than seventy-five percent of data from the log file.

12. The non-transitory computer readable medium of claim 8, wherein generating the interpretation results includes:

generating interpretation results that reproduce less than half of data from the log file.

13. The non-transitory computer readable medium of claim 8, wherein:

the exchange analysis results include the duration for the system prompt, the user response to the system prompt, and the duration for the user response.

14. The non-transitory computer readable medium of claim 13, wherein generating the interpretation results includes grouping the general analysis results together and grouping the exchange analysis results together.

15. The method of claim 2, wherein selecting the substitutions file includes selecting the substitutions file corresponding to a type of the automatic speech recognition system.

* * * * *

UNITED STATES PATENT AND TRADEMARK OFFICE
CERTIFICATE OF CORRECTION

| | | |
|---|---|---|
| PATENT NO. | : 8,625,773 B2 | Page 1 of 3 |
| APPLICATION NO. | : 12/106753 | |
| DATED | : January 7, 2014 | |
| INVENTOR(S) | : Scott H. Mills et al. | |

It is certified that error appears in the above-identified patent and that said Letters Patent is hereby corrected as shown below:

In the Claims

Column 9, line 3 - Column 10, line 42, claims 8 through 15 should read as follows:

<u>8</u>. The method of claim 2, wherein selecting the substitutions file includes selecting the substitutions file corresponding to a type of the automatic speech recognition system.

<u>9</u>. A non-transitory computer readable medium including stored, processor executable instructions that, when executed by a processor, cause the processor to perform operations comprising:
    selecting a log file to be processed in response to receiving a first user input during a telephone call, wherein selection of the log file is based on a name of an individual and further wherein the log file contains log records indicative of an interaction between the individual and an automatic speech recognition system;
    selecting, in response to receiving a second user input, a substitutions file for use by the processor in the processing of the log file;
    substituting replacement character strings for log record character strings that match original character strings, wherein the replacement character strings and the corresponding original character strings are listed in the substitutions file, and wherein the replacement character strings are human-readable text strings; and
    interpreting data in the log records and generating interpretation results including general analysis results and exchange analysis results;
    generating an output file including the interpretations results;
    wherein the general analysis results in the output file include:

Signed and Sealed this
Eighth Day of July, 2014

Michelle K. Lee
*Deputy Director of the United States Patent and Trademark Office* an identifier for the individual, a date for the telephone call, a start time for the telephone call, an end time for the telephone call, an overall duration for the telephone call, a total amount of time spent playing prompts, an identifier for a particular call to distinguish multiple calls from the same individual, an identifier to indicate one of multiple call designs being tested, a duration of time spent in dialog between the caller and the ASR system, the elapsed time between termination of the automatic speech recognition dialog and pick up by an operator, the time duration for storing and forwarding information received from the individual to the operator, and the time duration spent with the subject connected to the operator;

wherein the generated interpretation results include a duration for a time interval between the end of a system prompt communicated to the individual by the automatic speech recognition system and a user response to the system prompt.

10. The non-transitory computer readable medium of claim 9, wherein interpreting data in the log records and generating the interpretation results comprises:

identifying a start time for the system prompt within the log file;

identifying an end time for the system prompt within the log file; and computing the duration for the system prompt, based on the start time and the end time.

11. The non-transitory computer readable medium of claim 9, wherein interpreting the data in the log records and generating the interpretation results comprises:

identifying a start time for the user response within the log file;

identifying an end time for the user response within the log file; and computing the duration for the user response, based on the start time and the end time.

12. The non-transitory computer readable medium of claim 9, wherein generating the interpretation results includes:

generating interpretation results that reproduce less than seventy-five percent of data from the log file.

13. The non-transitory computer readable medium of claim 9, wherein generating the interpretation results includes:

generating interpretation results that reproduce less than half of data from the log file.

14. The non-transitory computer readable medium of claim 9, wherein:

the exchange analysis results include the duration for the system prompt, the user response to the system prompt, and the duration for the user response.

15. The non-transitory computer readable medium of claim 14, wherein generating the interpretation results includes grouping the general analysis results together and grouping the exchange analysis results together.